3,523,808
NITROACETAL COMPOUNDS
Marvin H. Gold, Sacramento, and Henry J. Marcus, West Covina, Calif., assignors to Aerojet-General Corporation, Azusa, Calif., a corporation of Ohio
No Drawing. Application Nov. 29, 1963, Ser. No. 327,877, now Patent No. 3,291,833, dated Dec. 13, 1966, which is a continuation-in-part of application Ser. No. 2,072, Jan. 12, 1960. Divided and this application Oct. 19, 1965, Ser. No. 529,892
Int. Cl. C07c 43/00; C08f 45/34
U.S. Cl. 106—287      1 Claim

ABSTRACT OF THE DISCLOSURE

Nitroacetals prepared by reacting 2,2-dinitropropanol with an aldehdye in the presence of an acid esterification catalyst useful as plasticizers for solid rocket propellants.

---

This application is a division of Ser. No. 327,877, filed Nov. 29, 1963, now Pat. No. 3,291,833, which was a continuation-in-part of Ser. No. 2,072, filed Jan. 12, 1960, now abandoned.

This invention relates to novel nitroacetal compounds and methods for their preparation. More specifically, this invention relates to an improved method of preparing nitroacetal compounds.

It is an object of this invention to prepare novel chemical compounds. It is another object of this invention to provide a new process for preparing chemical compounds. These and other objects of the invention will be apparent from the detailed description which follows.

The nitroacetals of this invention have the following generic formula:

(I)
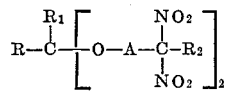

wherein R is a hydrogen or an alkyl radical; $R_1$ is a hydrogen or an alkyl radical; $R_2$ is a hydrogen, alkyl, halogen, nitroalkyl, aryl, cycloalkyl, haloalkyl or nitrazaalkyl radical; and A is an alkylene radical. Preferably, the alkyl, nitroalkyl, aryl, cycloalkyl, haloalkyl, and nitrazaalkyl radicals in the foregoing formula are the lower members of the series, preferably members containing from 1 to about 8 carbon atoms. Most preferably, as can be seen from the examples appearing hereinafter, R and $R_1$ are hydrogen or alkyl, from 1 to 4 carbon atoms; $R_2$ is hydrogen, chloro, alkyl of 1 to 2 carbons, nitroalkyl of 2 to 3 carbons, aryl of 6 carbons, haloalkyl of 2 carbons and nitrazaalkyl of 2 carbons; and A is alkylene of 1 to 4 carbons.

The novel method of this invention comprises reacting an aldehyde or a ketone with a nitroalcohol in accordance with the general reaction scheme set forth below:

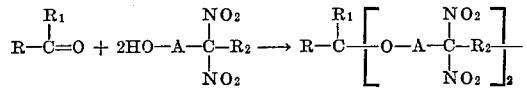

wherein R, $R_1$, $R_2$ and A are as defined above.

It will be apparent that a great number and variety of compounds within the scope of this invention can be prepared by simply reacting a suitable aldehyde or ketone with a suitable nitroalcohol in accordance with the method described herein. Examples of aldehydes and ketones suitable as reactants for our novel methods are: isobutyraldehyde, isopentanaldehyde, 2-methyl butyraldehyde, 2-methyl pentanaldehyde, 3-methyl pentanaldehyde, 2-ethyl enanthaldehyde, 2-isopropyl enanathaldehyde, methyl isopropyl ketone, methyl isobutyl ketone, ethyl isobutyl ketone, ethyl hexyl ketone, ethyl isohexyl ketone, diisopropyl ketone, dibutyl ketone, diethyl ketone, and methyl octyl ketone. Examples of nitroalcohols suitable as reactants for the method of this invention are: 2,2-dinitropropanol; 4-nitraza - 2,2 - dinitro-n-pentanol; 2,2,4,4-tetranitro-n-pentanol; 4-chloro - 2,2 - dinitro-n-butanol; 2,2-dinitroethanol, 2-chloro-2,2-dinitroethanol; 3,3-dinitro-3-phenyl-propanol; 3,3-dinitro -3 - cyclohexyl-propanol; and 3,3-dinitro-1-butanol.

It is within the scope of our invention to form the aldehyde or ketone starting material for the above reaction scheme in situ. Thus, a polymer which depolmerizes to yield an appropriate aldehyde or ketone can be added to the system along with a suitable depolymerization catalyst. For example, paraldehyde, a trimer of acetaldehyde, can be depolymerized in situ to furnish acetaldehyde for our novel reaction. Likewise, paraformaldehyde, a polymer of formaldehyde, can be added along with a depolmerization catalyst which causes it to break down and yield formaldehyde in situ. However, best yields of the desired acetals are obtained when the formaldehyde is generated in situ from s-trioxane. Catalysts particularly adaptable for this purpose are catalysts such as sulfuric acid, boron trifluoride ($BF_3$), ferric chloride, p-toluene sulfonic acid, m-benzene disulfonic acid, zinc chloride, HCl, HF, boron trifluoride complexes, etc.

The reaction of this invention is preferably conducted in an inert solvent. Any organic solvent known to those skilled in the art, such as benzene, toluene, chloroform, carbon tetrachloride, methylene chloride, ethylene dichloride, etc., is suitable as a medium for the reaction of this invention. Although we prefer to employ an organic solvent as a reaction medium, it is within the scope of our invention to conduct the reaction in any other suitable liquid compatible with the system. For example, an excess of a reactant, such as 2,2-dinitropropanol, or a liquid catalyst, such as sulfuric acid, which may include small amounts of water, can be so employed.

It is preferable to conduct the reaction of this invention in the presence of a catalyst, especially in the presence of an acid esterification catalyst. The acid esterification catalysts are dehydrating agents which take up the water as it is formed during the reaction. The catalysts mentioned above as suitable for the in situ formation of aldehydes and ketones are likewise suitable for the primary reaction of our invention. Consequently, where in situ depolymerization is to be effected, the same material can be employed to accomplish this and to catalyze our novel reaction. In addition, compounds generally capable of forming alcoholates such as, for example, calcium chloride are suitable catalysts for the reaction of this invention. However, for highest yields, it has been found that some catalysts are uniquely suited for use in certain reactions. Specifically, it has been found that boron trifluoride is an excellent catalyst in the production of acetaldehyde, bis-(2,2-dinitropropyl) acetal; and that concentrated sulfuric acid (90–99% by weight) gives superior yields of formaldehyde, bis-(2,2-dinitropropyl) acetal.

Reaction temperature is not critical to the operability of our novel method, the only significant effect of an increase or decrease in temperature being a corresponding increase or decrease in reaction rate. While reaction temperature is not critical, it is preferred, for reasons of economy of operation and convenience, to employ temperatures within the range from −20° C. to about 50° C. in the practice of this invention. The process may be carried out at any convenient pressure, normally from 0.1 to about 100 atmospheres. Normally, the reaction is carried out at ordinary atmospheric pressure. The reactants may be employed in varying ratios. However, usually the aldehyde and nitroalcohol are used in about stoichiometric amounts. The catalysts employed in the reaction are preferably present in an effective catalytic amount of from about 0.1% to about 20% by weight, based on the total weight of reactants.

The β-gem-dinitroalcohol reactants, such as 2,2-dinitroethanol, are preferably prepared by acidifying the corresponding alkali metal salts according to the method described by Duden and Pondorff in Ber., 38, 2031 (1905). 2,2,4,4-tetranitrobutanol can be prepared by acidifying a salt of dinitroethanol to form the salt of 2,2,4,4-tetranitrobutanol from which the free alcohol is prepared by adding acid. This method is more fully described in assignee's copending U.S. patent application Ser. No. 662,549, filed May 29,1957 now Patent No. 3,020,317.

4,4-dinitro-1-alkanol reactants for my novel method can be prepared by the selective reduction of Michael adducts to 1,1-dinitroalkanes which are then reduced to the desired dinitroalcohols. For a more detailed description of this method, see Shechter et al., Journal of American Chemical Society, 74, 3664 (1952); and Feuer et al., Journal of American Chemical Society, 77, 5740 (1955). 3,3-dinitro-1-alkanols can be prepared by reacting the corresponding primary amines with nitrous acid to form unstable compounds to the desired alcohols with evolution gaseous nitrogen, as more fully explained by Herzog et al., Journal of Organic Chemistry, 23, 1809 (1958).

The secondary nitroalkanol reactants of this invention are prepared by the selective reduction of ketones with sodium borohydride. The ketones are obtained by the well-known Michael addition of an alkyl vinyl ketone such as methyl vinyl ketone to active hydrogen compounds as more fully explained on page 484 of "Advanced Organic Chemistry" by Fuson, John Wiley & Sons, Inc. (1959).

It will be apparent that a great number and variation of acetals within the scope of the invention can be prepared by reacting appropriate starting materials according to the method taught therein.

Mixtures of the reactants of our novel method can be employed in the practice of our invention and it is thus within the scope of the invention to prepare acetals having mixed alkoxy groups.

It will be apparent that the novel nitroacetals of this invention are either acetals or ketals, depending on the nature of the R and $R_1$ radicals, in the generic formula. However, all of our novel compositions are generically referred to and identified herein as acetals in accordance with the normal practice employed in the literature. This practice is recognized and followed by Chemical Abstracts as noted in Section 209 of the nomenclature pamphlet entitled The Naming and Indexing of Chemical Compounds by Chemical Abstracts, (1962), available at the Office of Chemical Abstracts, the Ohio State University, Columbus, Ohio.

To contribute to a better understanding of this invention, the following examples are presented. It should be understood, however, that these examples are presented merely as a means of illustration and that the invention is not limited to the particular embodiments and conditions described therein.

EXAMPLE I

Preparation of formaldehyde, bis-(2,2-dinitropropyl)acetal

A 100-ml. flask fitted with stirrer and thermometer was charged with 15 ml. ethylene dichloride, 80.0 g. 2,2-dinitropropanol (0.50 M, 93.6 percent pure), and 19 ml. concentrated (96 percent) sulfuric acid. Mixing took place with mild evolution of heat, and moderate cooling was applied. At 20–25° C., 7.8 g. (0.24 M) paraformaldehyde (91 percent flake) was added, resulting in a mildly exothermic reaction. The temperature was maintained below 30° C. with cooling. Agitation was continued for one hour at 25–30° C. The upper layer was separated with the aid of methylene chloride, and the reaction mixture extracted again with the same solvent. The organic phase was washed twice with dilute sodium hydroxide solution, twice with water, and dried over sodium sulfate. The solvent was removed in vacuo, leaving 66.7 g. (90 percent of theory) of a viscous, colorless liquid, $n_D^{25}$ 1.4637.

Forty grams of the crude acetal were dissolved in 100 ml. denatured ethyl alcohol. At 12° C., seed crystals were added. The mixture was chilled to −20° C., and the colorless product filtered, washed, and dried. The yield was 30.2 g. (76 percent).

Elemental analysis of a sample twice recrystallized from methanol (M.P. 32.5–33.5° C.):

Calc. for $C_7H_{12}N_4O_{10}$ (percent): C, 26.93; H, 3.87; N, 17.95. Found (percent): C, 27.41; 27.28; H, 3.74, 3.75; N, 17.95; 18.22.

A more preferred method of preparing formaldehyde, bis-(2,2-dinitropropyl) acetal entails the reaction of approximately stoichiometric amounts of 2,2-dinitropropanol and s-trioxane in the presence of concentrated sulfuric acid. The use of these specific reactants catalysts have been found to substantially increase the yield of the desired compound as is shown by the following example.

EXAMPLE II

Into a 1-liter, 3-necked, glass jacketed flask equipped with a motor driven stirrer, thermometer and a dropping funnel was placed 1.26 moles of 30 percent 2,2-dinitropropanol in ethylene chloride and 18.8 grams of s-trioxane. The solution was stirred while 0.964 moles of concentrated sulfuric acid was added drop wise over a period of 15 minutes. The mixture was then stirred for an additional 30 minutes. The temperature during the addition and stirring was maintained at 24–26° C. The organic layer was separated and stirred with 300 ml. of 5 percent aqueous sodium hydroxide for 15 minutes at 10–15° C., then allowed to separate for 8 minutes. The organic layer was separated and washed three times with 250 ml. portions of tap water during a 1 minute stir period at ambient temperature and 3–5 minutes settling time. The pH of the final water wash was 6.2. The ethylene chloride-formaldehyde bis-(2,2-dinitropropyl) acetal solution was then evaporated at 45° C. under water aspirator vacuum for 30 minutes, then under vacuum pump pressure at less than 1 mm. Hg for 2 hours at 45° C. The resulting residue of formaldehyde bis-(2,2-dinitropropanol) acetal was obtained in 83.7 percent yield.

As can be seen by comparing Example I and Example II, the use of s-trioxane as the source of formaldehyde in the preparation of this acetal results in a substantial increase in the yield of the desired product.

EXAMPLE III

Preparation of acetaldehyde, bis-(2,2-dinitropropyl) acetal

One-tenth mole cf 2,2-dinitropropanol (15.8 g.), 4.0 g. calcium chloride, and 2,2 g. acetaldehyde (0.050 M) were mixed in a 50-ml. round-bottom flask. The flask was stoppered and taped to keep the stopper in place to avoid evaporation of the acetaldehyde. Most of the calcium chloride gradually went into solution. After isolation of the crude acetal by the procedure of Example I, 7.6 g. of colorless oil remained; $n_D^{25}$ 1.4588. The acetal was purified by crystallization from diisopropyl ether; weight 4.2 g. (26 percent), $n_D^{25}$ 1.4604.

EXAMPLE IV

Preparation of acetaldehyde, bis-(2,2-dinitropropyl) acetal

This is a description of the preparation of acetaldehyde, bis-(2,2-dinitropropyl) acetal in which the acetaldehyde starting material is prepared in situ from paraldehyde and an excess of sulfuric acid is utilized as the reaction medium.

A 50-ml. 3-necked flask, equipped with a stirrer, thermometer, and dropping funnel, was charged with 31.5 g. (0.20 M, 95.2 percent pure) 2,2-dinitropropanol and 15 ml. concentrated (96 percent) sulfuric acid. To this clear colorless solution 4.4 ml. (0.10 M as acetaldehyde) paraldehyde was added drop-wise with good stirring. The temperature was maintained between 0 and −5° C. during the ten-minute addition period. The mixture was stirred below 0° C. for one hour, during which time the color changed gradually to orange-brown. The apparently homogeneous reaction mixture was extracted twice with a total of 120 ml. methylene chloride. The extracts yielded 3.7 g. (11 percent of theory) of a light brown oil, $n_D^{25}$ 1.4638.

EXAMPLE V

Preparation of acetaldehyde, bis-(2,2-dinitropropyl) acetal

This example described the preparation of acetaldehyde, bis-(2,2-dinitropropyl) acetal by reacting acetaldehyde, formed in situ from paraldehyde, with 2,2-dinitropropanol in methylene chloride as a reaction medium.

A 100-ml. flask was charged with 15.8 g. (0.10 M, 95)-2,2-dinitropropanol, 25-ml. methylene chloride, 3 drops concentrated sulfuric acid, and 2.2 ml. (0.050 M) paraldehyde. Following 21 hours' reflux, about 0.5 ml. water had been removed azeotropically. The solution has turned a very dark brown. The crude acetal was isolated by washing the reaction mixture first with sodium hydroxide solution, then with water, drying the organic phase, and removing the solvent in vacuo. The residue was dark brown, weight 6.8 g. (42 percent of theory), $n_D^{25}$ 1.4625.

EXAMPLE VI

Preparation of acetaldehyde, bis-(2,2-dinitropropyl) acetal

A glass pressure vessel, kept in ice, was charged with 16 g. (0.10 M, 96 percent pure) 2,2-dinitropropanol, 4 g. powdered calcium chloride, and 2.2 g. (0.050 M) acetaldehyde. The vessel was then closed with a rubber stopper mechanically held in place to prevent loss of acetaldehyde by volatilization. The mixture was shaken vigorously initially, and about twice a day for the next six days while being kept at room temperature. The contents of the flask were then poured into ice water containing 1.6 g. sodium hydroxide, and the crude product separated with the aid of methylene chloride. The organic solution was extracted first with 20 ml. of one normal sodium hydroxide solution, then with 40 ml. ten percent by weight sodium bisulfite solution previously neutralized with sodium carbonate, and finally twice with water. The solution was dried and the solvent removed in vacuo. The viscous light green residue weight 3.9 g, $n_D^{25}$ 1.4588. Vacuum distillation resulted in a forerun at 110–165° C. at 0.45 mm., and a clear yellow residue, 2.6 g. (16 percent of theory), $n_D^{25}$ 1.4607. Its infrared spectrum was identical with that of a known sample of acetaldehyde, bis-(2,2-dinitropropyl) acetal is illustrated by the following example wherein the reaction is carried out in the presence of boron trifluoride as the catalyst.

EXAMPLE VII

In the 1-liter, 3-necked glass jacketed flask equipped with a motor driven stirrer, thermometer and gas dispersion tube, one mole of 30 percent 2,2-dinitropropanol in ethylene chloride was mixed with 35.2 gram of paraldehyde and cooled to −20° C. Anhydrous boron trifluoride (0.35 mole) was then added to the solution over a period of 5 minutes; the mixture was then stirred for an additional 2 minutes. The temperature is maintained between −15 and −20° C. during the course of the boron trifluoride addition. 500 grams of tap water was then added to the reaction mixture keeping a temperature below −10° C. The mixture was stirred for three minutes, then allowed to settle and finally separated. The organic layer was then treated with 5 percent aqueous sodium hydroxide to a pH of 10, then stirred for one half hour keeping the temperature at 15° C. The washed solution was then allowed to separate. The organic layer was then treated with 200 ml. of 5 percent sodium hydroxide and stirred for one half hour at ambient temperature. After separation, the organic layer was washed three times with 250 ml. portions of tap water at ambient temperature. The pH of the final wash was 6.8. Separation of the organic and aqueous layers was completed in three to five minutes. The acetaldehyde, bis-(2,2-dinitropropyl) acetal-ethylene chloride solution was then evaporated under water aspirator pressure at 45° C. for 30–45 minutes, then for 2 hours at a pressure of 0.6 mm. Hg. The resulting residue of acetaldehyde, bis-(2,2-dinitropropyl) acetal was obtained in 78 percent yield based on 2,2-dinitropropanol.

As can be seen by comparing Example VII with Examples III through VI inclusive, the use of boron trifluoride as the catalyst results in a substantial increase in the yield.

These results are summarized in the following table.

TABLE I

| Example No.: | Yield, percent |
| --- | --- |
| III | 26 |
| IV | 11 |
| V | 42 |
| VI | 16 |
| VII | 78 |

The best yield obtained without boron trifluoride is shown in Example V wherein the yield is 42 present. Thus, it is apparent that the use of boron trifluoride results in a near doubling of the yield of acetaldehyde bis-(2,2-dinitropropyl) acetal.

EXAMPLE VIII

Preparation of n-butyraldehyde, bis-(chloro-2,4,4-trinitro-1-butyl) acetal n-Butyraldehyde, bis-(chloro-3,4,4-trinitro-1-butyl) acetal is prepared by the method of Example VI by reacting n-butyraldehyde with 2-chloro-2,4,4-trinitro-butanol in the presence of p-toluene sulfonic acid as a catalyst.

EXAMPLE IX

Preparation of methyl-in-butyl ketone, bis-(5,5-dinitro-5-phenyl-1-pentyl) acetal Methyl-n-butyl ketone, bis-(5,5-dinitro-5-phenyl-1-pentyl) acetal is prepared by the method of the above-described examples by reacting methyl-n-butyl ketone with 5,5-dinitro-5-phenyl-1-pentanol in the presence of m-benzene disulfonic acid as a catalyst.

EXAMPLE X

Preparation of propionaldehyde, bis-(7-aza-5,5,7-trinitro-3-octyl) acetal

Propionaldehyde, bis-(7-aza-5,5,7-trinitro-3-octyl) acetal is prepared by the method of the above-described examples by reacting propionaldehyde with 7-aza-5,5,7-trinitro-3-octanol.

EXAMPLE XI

Preparation of acetaldehyde, bis-(2,2,4-phenyl pentyl) acetal

Acetaldehyde, bis-(2,2,4-phenyl pentyl) acetal is prepared by the method of the above-described examples by reacting acetaldehyde with 2,2,4-phenyl petanol.

EXAMPLE XII

Preparation of acetaldehyde, bis-(2,2,4-tetranitro-n-pentyl) acetal

Acetaldehyde, bis-(2,2,4,4-tetranitro-n-pentyl) acetal is prepared by the method of the above-described examples by reacting acetaldehyde with 2,2,4,4-tetranitro-n-pentanol.

The nitroacetals prepared by the novel method of this invention, and particularly the gem-dinitroacetals, are excellent plasticizers for use in the preparation of polyurethane binders for high energy solid rocket propellants such as those disclosed in assignee's copending U.S. patent application Ser. No. 829,180, filed July 20, 1959. The acetals are also suitable as plasticizers for nitrocellulose and nitropolymers such as the nitro-substituted polyurethane polymers disclosed in assignee's copending U.S. patent application Ser. No. 728,491, filed Apr. 14, 1958. The plasticizers prepared as taught herein contribute to the energy of propellants in which they are incorporated, because of their high nitro content. Hence, they are superior to commercial plasticizers presently available which contain no nitro groups and are, accordingly, substantially nonenergetic. In addition, the nitroacetals prepared by the method of this invention are compatible with those polyurethane sytems in which the monomers contain gem-dinitro or nitraza groups, with which systems nearly all plasticizers commercially available at present are incompatible.

In utilizing our nitroacetals as plasticizers for nitropolymer polymerization, the nitropolymers can be polymerized in the presence of the plasticizer or the plasticizer can be mixed into the nitropolymer after polymerization thereof. The plasticizers are incorporated into the nitropolymers in amounts preferably within the range from about 10 percent to about 40 percent by weight of the composition. When utilizing the acetals as plasticizers for polyurethanes which contain no nitro groups, such as the polyurethane binders for the solid propellants of the above-mentioned copending U.S. patent application, Ser. No. 829,180, the techniques of incorporating the plasticizer into the binder is essentially the same as that used with nitropolymers. The plasticizers are preferably incorporated in the propellants in amounts up to about 15 percent by weight thereof.

As explained in copending applications Ser. Nos. 728,491 and 829,180, the nitro-substituted polyurethanes of the former and the polyurethane propellants of the latter can be used as a primary propulsion source in rocket-propelled vehicles, and can also be used as a propellent for artillery missiles. When used as the primary propulsion source for rocket vehicles, they can be conveniently ignited by a conventional igniter, as for example, the igniter disclosed in assignee's copending U.S. patent application, Ser. No. 306,030, filed Aug. 23, 1952 now Pat. No. 3,000,312. The propellant is preferably cast in tubular form and restricted in the conventional manner with a relatively inert resin, such as a nonnitrated polyurethane foam or a polyester resin, and placed inside a chamber having one end open and leading into a conventional venturi rocket nozzle. Upon ignition, large quantities of gases are produced and exhausted through the nozzle creating propulsion force.

The preferred plasticizer for use in solid propellants is a mixture comprising an equal amount by weight of formaldehyde, bis-(2,2-dinitropropyl) acetal and acetaldehyde, bis - 2,2 - dinitropropyl) acetal. It has been found that this mixture blends more readily with the other propellant ingredients that does either of the compounds in their pure state.

The following illustrates a solid propellant formulation containing this novel plasticizer mixture:

EXAMPLE XIII

| Ingredient: | Weight percent |
|---|---|
| Nitroglycerin | 60.0 |
| Aluminum | 11.0 |
| Formaldehyde, bis - (2,2 - dinitropropyl) acetal | 7.5 |
| Acetaldehyde, bis-(2,2-dinitropropyl) acetal | 7.5 |
| 2-nitrodiphenylamine | 0.2 |
| Polypropylene ether glycol | 11.5 |
| Trimethylol propane | 0.5 |
| Tolylene diisocyanate | 1.6 |
| Dibutyl tin dilaurate | 0.2 |
| | 100.0 |

The foregoing materials were mixed at room temperature and then cured at about 90° F. for 24 hours. A tough rubbery propellant was obtained.

The nitroacetals of Formula I are unique among acetal compounds in that they possess the idea combination of properties for a propellant plasticizer, namely, high energy and excellent compatibility with the polyurethane binders.

Having described the invention, it is intended that it be limited only by the lawful scope of the appended claim.

We claim:

1. As a composition of matter, a mixture comprising about equal amounts by weight of acetaldehyde, bis-(2,2-dinitropropyl) acetal, and formaldehyde, bis - 2,2 - dinitropropyl) acetal.

References Cited

UNITED STATES PATENTS

| 2,227,128 | 12/1940 | Ellis. |
| 2,415,046 | 1/1947 | Senkus | 260—615 XR |

FOREIGN PATENTS

| 635,763 | 1/1962 | Canada. |
| 928,920 | 6/1963 | Great Britain. |
| 1,150,059 | 6/1963 | Germany. |

OTHER REFERENCES

Guccione: Chem. Eng., vol. 70, No. 7, pp. 62–64, Apr. 1, 1963.

HOWARD T. MARS, Primary Examiner

U.S. Cl. X.R.

149—88; 260—584, 611, 615, 632, 644